United States Patent [19]

Story et al.

[11] Patent Number: 4,901,751

[45] Date of Patent: Feb. 20, 1990

[54] FLUID CONTROL VALVE AND SYSTEM WITH LEAK DETECTION AND CONTAINMENT

[75] Inventors: Carl E. Story, Cupertino; Jerry A. Nichols, San Jose; Byron C. Cady, Gilroy, all of Calif.

[73] Assignee: Systems Chemistry, Inc., Milpitas, Calif.

[21] Appl. No.: 366,729

[22] Filed: Jun. 15, 1989

[51] Int. Cl.⁴ .................. G01M 3/08; G01M 3/38; F16K 37/00; F16K 51/00

[52] U.S. Cl. ......................................... 137/312; 73/40; 73/40.5 R; 73/46; 251/331; 340/605

[58] Field of Search .................... 73/40, 40.5 R, 46; 137/312, 375, 551, 558; 251/331, 335.2; 417/36, 278; 340/605, 619; 222/108

[56] References Cited

U.S. PATENT DOCUMENTS

| | | | |
|---|---|---|---|
| 2,691,773 | 10/1954 | Lichtenberger | 137/312 |
| 3,148,861 | 9/1964 | McFarland, Jr. | 251/331 |
| 3,154,286 | 10/1964 | McFarland, Jr. | 251/331 |
| 3,472,062 | 10/1969 | Owen | 73/40.5 R |
| 3,623,700 | 11/1971 | Boteler | 251/331 |
| 3,838,707 | 10/1974 | Wachowitz, Jr. | 137/312 |
| 4,010,769 | 3/1977 | De Lorenzo et al. | 137/312 |
| 4,386,269 | 5/1983 | Murphy | 73/40.5 R |
| 4,794,940 | 1/1989 | Albert et al. | 137/312 |

Primary Examiner—George L. Walton
Attorney, Agent, or Firm—Rosenblum, Parish & Bacigalupi

[57] ABSTRACT

A fluid control valve with leak detection and containment features for use in a fluid handling system incorporating one or more flow controlling devices each including: an actuator; a weir valve and associated valve housing; and a pair of spaced apart diaphragms, one of which serves as the closure member for the weir valve and the other providing a secondary seal defining the limits of a containment chamber for at once preventing contamination of the controlled fluid, protecting the actuating mechanism and allowing immediate detection of valve closure failure. A piston member disposed within the chamber is coupled to the two diaphragms, and a fluid detection device is disposed in communication with a sealed containment chamber formed between the two diaphragms. The system includes electronic control apparatus responsive to the detection device and is operative to instantaneously shut down the system in the event of a detected failure.

10 Claims, 2 Drawing Sheets

FLUID CONTROL VALVE AND SYSTEM WITH LEAK DETECTION AND CONTAINMENT

BACKGROUND OF THE INVENTION

1. Field of the Invention

The present invention relates generally to fluid flow control valves and more particularly to an improved valve assembly and having leak detection means and provisions for leak containment.

2. Brief Description of the Prior Art

There are numerous fluid flow control applications in which corrosive, caustic or chemically pure liquid flows must be controlled and various attempts have heretofore been made to provide suitable pneumatic and electrically actuated valves suited for such purpose. One such valve is the subject of De Lorenzo et al. U.S. Pat. No. 4,010,769. which discloses a valve including a plunger that is moveable by actuating means such as a solenoid, air valve or other means to move a closure member toward and away from a valve seat. The fluid handling position of the valve is sealed from the actuating means by secondary diaphragms, 0-rings or other forms of sealing structures in order to insure against leakage past the primary diaphragm or seal and especially against leakage into the actuating means. In the event of leakage past the first sealing means, flow of the liquid into the space between the first and second sealing means causes an outward flow of fluid through a venting passage which thereby provides an indication of leakage past the first sealing means so that the leak will be noticed and the first sealing means can be replaced before any damage to the actuating means or to the system itself occurs.

Although this valve is suitable for enabling detection of diaphragm failure, it is not directed toward applications in which corrosion or contamination of either the actuator mechanism or the fluid itself must be strictly limited. For example, in the semiconductor manufacturing industry the processing chemicals and deionized water supplies must be kept as pure as possible since even a momentary contact of the flow stream with a contaminating surface can result in a catastrophic event. Although the valve closure member shown in FIG. 1 of De Lorenzo is indicated as being made of Teflon, the surrounding valve body and associated parts appear to be metallic and would thus not be suited for applications in which diaphragm failure is likely to cause almost immediate contamination of the controlled fluid. Moreover, the thrust of the De Lorenzo invention is to protect the actuating mechanism from unintentional exposure to the controlled fluid as opposed to being directed to preventing contamination of the fluid. Futhermore, the valve device per se is a gate valve of a type which is not suited for certain applications in which back flow pressures can unseat the gate or perhaps even prevent its closure. And finally, no means for automatically detecting diaphragm failure is provided.

Another problem associated with valves of the type disclosed by De Lorenzo, et al. is that frictional engagement of sealing surfaces deleteriously affects the useful lifetime of the valve, and the tendency of the sealing surfaces to be residually deformed after closure for extended periods of time may limit the sealing ability of the device. The Stack U.S. Pat. Nos. to Stack 4,538,638, Botelar 3,407,838, McFarland 3,542,286 and Priese 3,451,423 disclose weir type valves are more suited to such applications. However, such devices have not been adapted to address the problem of fluid contamination as a result of the leakage and the need for immediate and automatic detection of diaphraqm failure.

SUMMARY OF THE PRESENT INVENTION

It is therefore a principal objective of the present invention to provide an improved fluid flow control system having means for avoiding contamination of the controlled fluid in the event of valve failure.

A further object of the present invention is to provide a device of the type described which includes means for providing immediate detection of diaphragm failure.

Another object of the present invention is to provide a device of the type described having leak containment features.

A still further object of the present invention is to provide a device of the type described having sealing surfaces which mate without substantial rubbing contact.

Briefly, a preferred embodiment of the present invention comprises a fluid handling system incorporating one or more flow controlling devices including an actuator, a weir valve and associated valve housing, a pair of spaced apart diaphragms, one of which serves as the closure member for the weir valve and the other providing a secondary seal defining the limits of a containment chamber for at once preventing contamination of the controlled fluid, protecting the actuating mechanism and allowing immediate detection of the valve closure failure. A piston member disposed within the chamber is coupled to the two diaphragms, and a fluid detection device is disposed in communication with the sealed containment chamber formed between the two diaphragms. The system includes electronic control apparatus responsive to the detection device and operation to instantaneously shut down the system in the event of a detected failure.

An important advantage of the present invention is that even in the event of a diaphragm failure, no contamination will occur because all wetted surfaces of both valve and containment chamber components are constructed of or are coated with a chemically inert material.

Another advantaqe of the present invention is that in the event of diaphragm failure, diaphragm leakage will be contained within the space between the two diaphragms.

Yet another advantage of the present invention is that means is provided for immediately detecting diaphragm failure so that instantaneous shutdown of the fluid supply system can be achieved.

These and other objects and advantages of the present invention will no doubt become apparent to those skilled in the art after having read the following detailed description of the preferred embodiment which is described in the several figures of the drawing.

IN THE DRAWING

DETAILED DESCRIPTION OF THE PREFERRED EMBODIMENT

Figure 1:
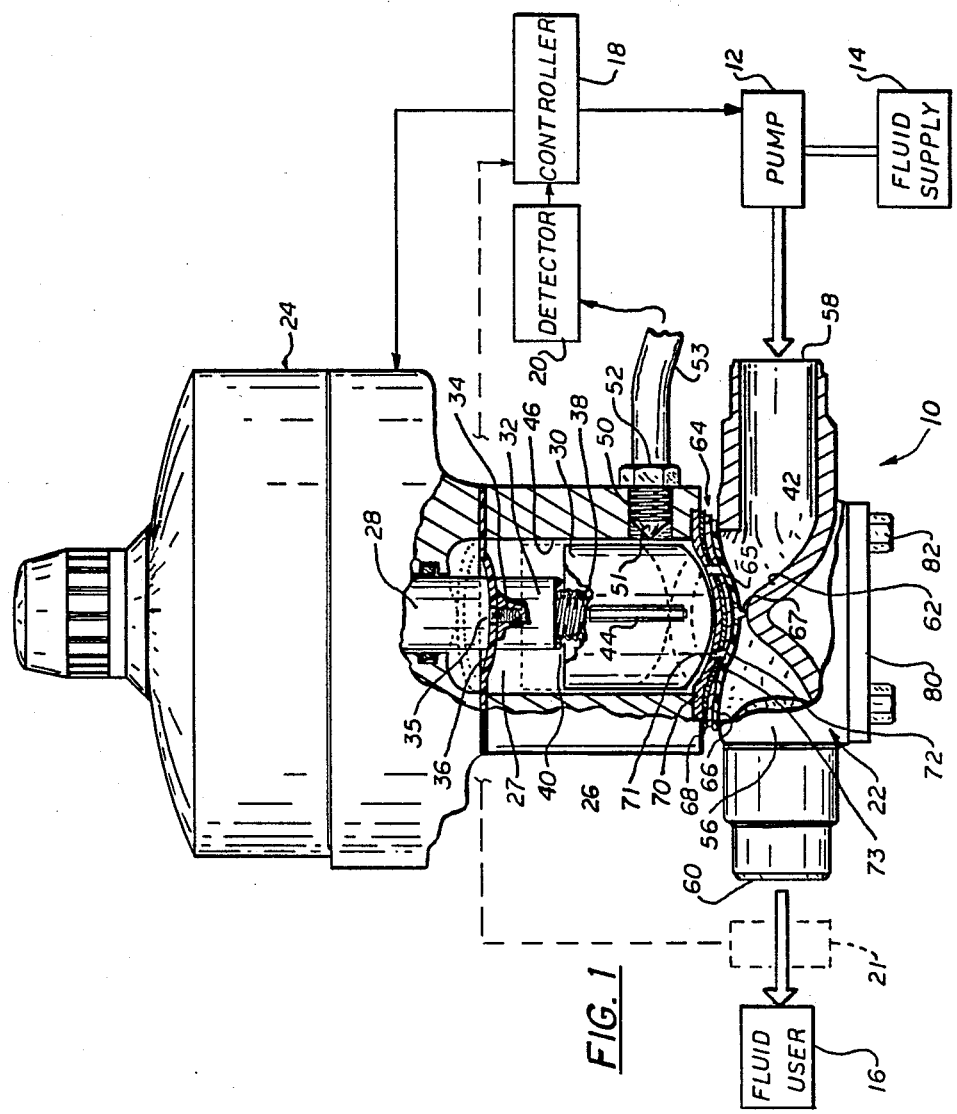
FIG. 1 is partially broken elevational view showing a fluid control system including a valve apparatus in accordance with the present invention.

Referring now to FIG. 1 of the drawing, there is shown a fluid flow control system and control valve apparatus in accordance with the present invention.

More specifically, as schematically depicted in block diagram form, the valve assembly 10 controls the flow of fluid in the form of either liquid or has pumped by a pump 12 from a fluid supply 14 to a fluid user 16. Actuating control for valve assembly 10 and pump 12 is provided by a controller 18, and a detector 20 responds to leaks within valve assembly 10 and outputs signals to controller 18 which will cause immediate shut-down of the pumping system. In addition, the system may include an in-line filter, as illustrated by the dashed lines 21, including a suitable pressure or, contamination detector, capable of likewise signaling controller 18.

It will be noted that the component parts of assembly 10 include a weir valve 22, an actuator mechanism 24, and a mechanism housing 26 which physically couples the actuator assembly to the valve body and forms a containment chamber 27.

Actuator mechanism 24 can be of any suitable type of electrical, hydraulic or pneumatic linear actuator and includes an armature 28 which is attached to a plunger 30 by means of an actuator rod 32. A threaded extension 34 of armature 28 extends through an opening 35 in a diaphragm 36 to threadably engage the upper end of actuator rod 32 which is in turn threadably coupled to plunger 30. Diaphragm 36 is preferably made of an inert flexible plastic material such as polyetralouroethylene (PTFE), and has a formed central portion 37 which accommodates the axial motion of armature 28 and actuator rod 32. Actuator rod 32 is preferably made of type 304 stainless steel polyfluroaloxyl (PFA), and has a female threaded bore at its upper end for receiving the threaded end 34 of armature 28. The lower end is externally threaded as indicated at 38 and is adapted to pass through a PTFE sealing ring 40 and is to be threadably received within the axially continuous bore of plunger 30 which will be further described below.

Plunger 30 is a generally cylindrical body having a rounded lower surface 42 and is moveable between the valve closed position shown and the valve open position depicted by the dashed lines 30'. Extending from opposite sides of plunger 30 are guide ribs 44 which engage slots (shown in FIG. 2) formed in the internal wall 46 of housing 26 to prevent rotation of plunger 30 as it is moved up and down.

Housing 26 is formed as a generally rectangular body made of either a molded inert plastic material or is of 304 stainless steel coated with PFA and has a cylindrically configured axial bore 46 extending therethrough. Bore 46 is provided with slots (as shown) formed in opposite sides thereof which receive the ribs 44 of plunger 30 and serve to guide and prevent rotation of plunger 30 as it moves longitudinally within bore 46. Housing 26 is also provided with a tapped bore 50 extending transversely into communication with bore 46. Bore 50 is adapted to receive the threaded end of a suitable leak trace detection probe 52.

Valve 22 is of the weir type disclosed generally in several of the prior art patents mentioned above and is comprised of a molded valve body 56 made of PFA and has transversely directed inlet and outlet openings 58 and 60, respectively, and an internal weir 62, the upper portion of which forms a valve slot. The primary diaphragm assembly 64 is actually comprised of two diaphragm members 65 and 66. Member 65 is a molded member made of PTFE and forms the primary closure diaphragm of the valve. As indicated at 67, it includes an integrally formed rib 67 which sealing engages the top surface of weir 62 when the valve is in its closed state. Disposed immediately adjacent and above diaphragm 65 is the supporting diaphragm assembly 66 which is of bonded composite construction and includes three layers 66, 68 and 70 made of PTFE, VITON and PTFE respectively and includes a formed central portion 72 which, as will be described below, is attached to plunger 30. Assembly 66 is provided with a durability of openings 71 which extend therethrough to provide a passage for fluid into chamber 27 in the event that the diaphragm should fail.

The above described valve and actuator assembly is held in place by a retaining plate 80 and four retaining bolts 82 which extend through openings in valve body 56, the diaphragms 65, and 66, the housing 26, and diaphragm 36 to be threadably received within threaded bores provided in the lower part of actuator assembly 24.

The leak trace deprotection probe 52 preferably includes an optical detector coupled to a fiber optics conductor 53 and is comprised of a conically configured tip 51 which faces the chamber 27 formed by bore 46. The tip 51 has an index refraction which, when surrounded by air, has a high level of internal reflection, but when in contact with a liquid, assumes a materially different reflective characteristic. As a consequence, the level of light transmitted to the tip 51 through one or more of the fibers of conductor 53 and reflected back into other receiving fibers falls below a detection threshold and a leak is signaled.

Alternately, a suitable resistive, capacitive or other appropriate type of probe could be substituted for the optical leak trace probe presently illustrated at 52.

Figure 2:
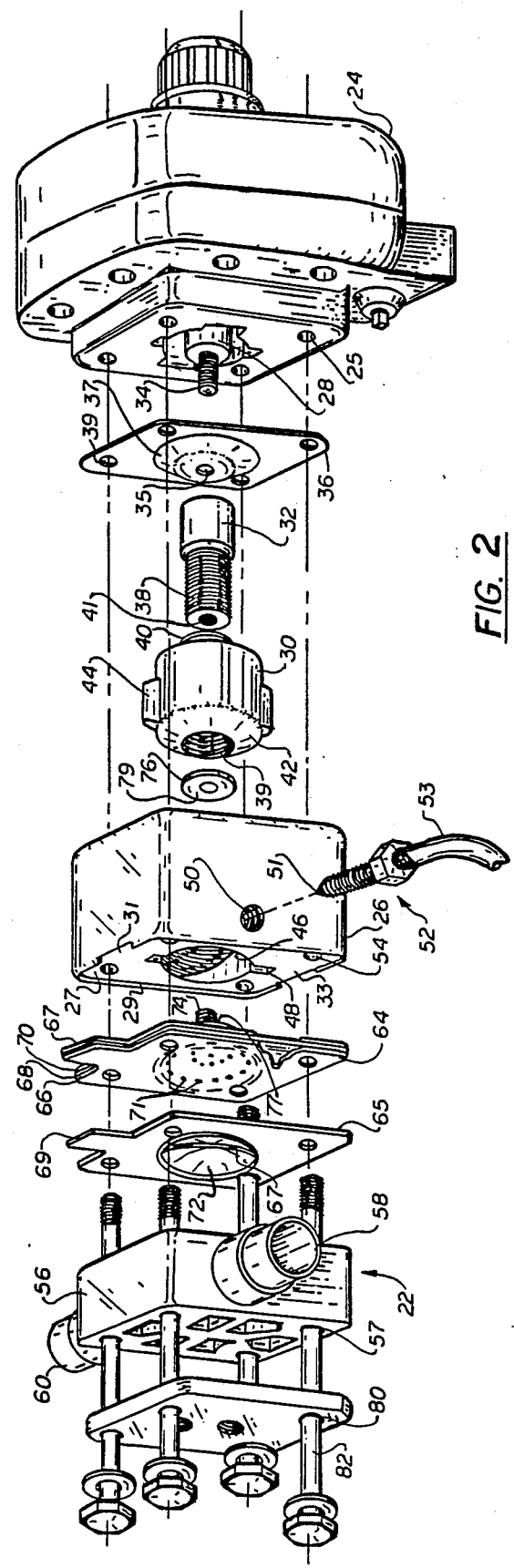
FIG. 2 is an exploded perspective view further illustrating the components of the embodiment shown in FIG. 1.

Turning now to FIG. 2 of the drawing, further detail of the presently preferred embodiment is illustrated. For example, note that the secondary diaphragm 36 is generally rectangular in configuration and includes openings 39 provided at each corner for receiving the retainer bolts and allowing them to be threaded into the tapped openings 25 in the housing of actuator assembly 24. Note also the central aperture 35 through which the threaded extension 34 of armature 28 is extended so that it can be threaded into the upper end of rod 32 as previously described. The threaded portion 38 of rod 32 is long enough to extend through the tapped bore 39 of plunger 30 to sandwich the sealing washer 76 between the distal end of rod 32 and a mating surface 77 affixed to the central portion of the upper side of diaphragm assembly 64. Formed integral therewith and extending upwardly (rightwardly as depicted in FIG. 2) is a threaded attachment shaft 74 which is extended through the aperture 79 in washer 76 and thence threaded into tapped bore 41 in rod 32.

With regard to housing 26, note that the face 27 is recessed and surrounded by a lip 29 which is notched as indicated at 31 and 33 so as to receive the alignment tabs 63 and 69 of the diaphragms 66 and 65 respectively. This insures that the diaphragms will be installed correctly and in the proper orientation so that the rib 67 will be properly aligned with the weir 62.

As indicated in the drawing, each of the components 26, 66, 65, 56 and 80 includes an aperture formed in each corner thereof for receiving one of the retaining bolts 82.

It will be appreciated that since all of the component parts between secondary diaphragm 36 and retainer plate 80 are either fabricated of a plastic material, or are fabricated of stainless steel coated with a plastic material, any surface that is either wetted or is likely to be wetted in the event of a diaphragm failure will cause no contamination of the fluid.

With regard to the support diaphragm assembly 66, it should be pointed out that the interior surfaces of the openings 71 passing through the entire assembly are coated with a plastic such as PTFE to prevent fluid contact with the Viton layer 68.

Once assembled and in operation, the valve assembly 10 can be used to accurately control fluid flow from any supply, such as depicted at 14, to any user, such as depicted at 16 in FIG. 1. In the event that the primary diaphragm 65 should fail for any reason, the fluid leaking therethrough will immediately pass through the opening 71 in the supporting diaphraqm assembly 66 and into the chamber 27 wherein it will contact the end 51 of probe 52 and cause detector 20 to sense the presence of the leak and signal controller 18 to shut down both the pump and cause plunger 30 to be driven downwardly to halt the flow of fluid through the system. Since secondary diaphraqm 36 causes the upper end of chamber 27 to be sealed, the leakage will be contained therewithin and since all of the surfaces within chamber 27 are either made of or are coated with an inert plastic, no contamination of the fluid will occur. In order to insure that the secondary diaphragm 36 does not fail before the primary diaphragm 65, care is taken in its design to insure so that its cycle life substantially exceeds that of diaphragm 65.

Although the present invention has been disclosed in terms of a single preferred embodiment, it is anticipated that numerous modifications and alterations thereof will be apparent to those skilled in the art after having read this disclosure. Accordingly, it is intended that the appended claims be construed broadly to cover all such alterations and modifications as fall within the true spirit and scope of the invention.

What is claimed is:

1. In a fluid control system including control means and valve means responsive thereto for controlling the flow of fluid between a source and a user, an improved valve means comprising:
   a valve including a valve seat and closure means carried by a first diaphragm means for engaging said valve seat to terminate flow through said valve, said valve seat being formed by the top of a weir and said closure means including a rib formed in a surface of said first diaphragm means and extending across a diameter thereof so that substantially equal surface areas of said first diaphragm means are disposed on opposite sides of said weir, said rib being adapted to engage said valve seat to effect closure of the fluid flow path through said valve;
   secondary diaphragm means and housing means cooperating with said first diaphragm means to form a closed containment chamber;
   actuator means extending through said chamber to selectively cause said closure means to move between an open state and a closed state; and
   leak detector means disposed in sealed communication with said chamber to detect the presence of any fluid entering said chamber and operative to generate a leak detection signal which can be used to provide an immediate indication of a leak into said chamber, said control means being responsive to said leak detection signal and operative to cause said actuator means to close said valve and terminate the flow of fluid from said source to said user to prevent any contamination in the chamber from entering into the fluid flow.

2. In a fluid control system as recited in claim 1 wherein said leak detector means is an optical sensor extending through an opening in a wall of said housing and adapted to optically detect the presence of any fluid within said chamber.

3. In a fluid control system as recited in claim 1 wherein all surfaces forming or disposed within said chamber are coated with an inert plastic material so as to prevent contamination of any fluid leaking into said chamber.

4. In a fluid control system as recited in claim 1 wherein said first diaphragm means includes a diaphragm support member disposed within said chamber and adjacent said first diaphragm means, said support member being apertured to permit any fluid passing through said first diaphragm means to pass into said chamber.

5. In a fluid control system as recited in claim 4 wherein said support member is a multilayered diaphragm assembly comprised of a first relatively flexible inert plastic material and a second relatively flexible inert material bonded to each side of a sheet of relatively unstretchable material, said diaphragm assembly forming a relatively stiff but flexible support for said first diaphragm means.

6. An electrically actuateable valve means for use in a contamination free fluid control system including condition responsive valve control means, comprising:
   means forming an inlet, an outlet and a valve seat;
   first diaphragm means forming a closure means for engaging said valve seat to terminate flow through said valve means from said inlet to said outlet;
   secondary diaphragm means;
   housing means cooperating with said first and second diaphragm means to form a closed containment chamber;
   diaphragm support means disposed within said chamber and adjacent to said first diaphragm means, said support means being apertured to permit any fluid passing through said first diaphragm means to pass into said chamber;
   leak detector means disposed in sealed communication with said chamber to detect the presence of any fluid entering said chamber and operative to generate a leak detection signal which can be used to provide an immediate indication of a leak into said chamber; and
   actuator means connected to said first and second diaphragm means and extending through said chamber to permit said closure means to be moved between an open state and a closed state, said actuator means being responsive to said leak detection signal and operative to close said valve means to terminate fluid flow therethrough and thereby prevent any contamination in the chamber from entering into the fluid flow.

7. An electrically actuateable valve means as recited in claim 6 wherein said valve includes a weir and said closure member includes a rib formed in a surface of said first diaphragm means and adapted to engage a surface of said weir to effect closure of the fluid flow path through said valve.

8. An electrically actuateable valve means as recited in claim 6 wherein said leak detector means is an optical sensor extending through an opening in a wall of said housing and adapted to optically detect the presence of any fluid within said chamber.

9. An electrically actuateable valve means as recited in claim 6 wherein all surfaces forming or disposed within said chamber are coated with an inert plastic material so as to prevent contamination of any fluid leaking into said chamber.

10. An electrically actuateable valve means as recited in claim 6 herein said support member is a multilayered diagram assembly comprised of a first relatively flexible inert plastic material and a second relatively flexible inert material bonded to each side of a sheet of relatively unstretchable material, said diaphragm assembly forming a relatively stiff but flexible support for said first diagram means.

* * * * *